(No Model.) 2 Sheets—Sheet 1.

J. S., S. W., & T. B. ROWELL.
COMBINED OR INTERCHANGEABLE SEEDER AND DRILL.

No. 343,280. Patented June 8, 1886.

Witnesses:
Louis M. F. Whitehead.
Jesse Cox Jr.

Inventors:
John S. Rowell
Samuel W. Rowell
Thaddeus B. Rowell
by M. E. Dayton
Attorney.

N. PETERS, Photo-Lithographer, Washington, D. C.

(No Model.) 2 Sheets—Sheet 2.
J. S., S. W., & T. B. ROWELL.
COMBINED OR INTERCHANGEABLE SEEDER AND DRILL.
No. 343,280. Patented June 8, 1886.
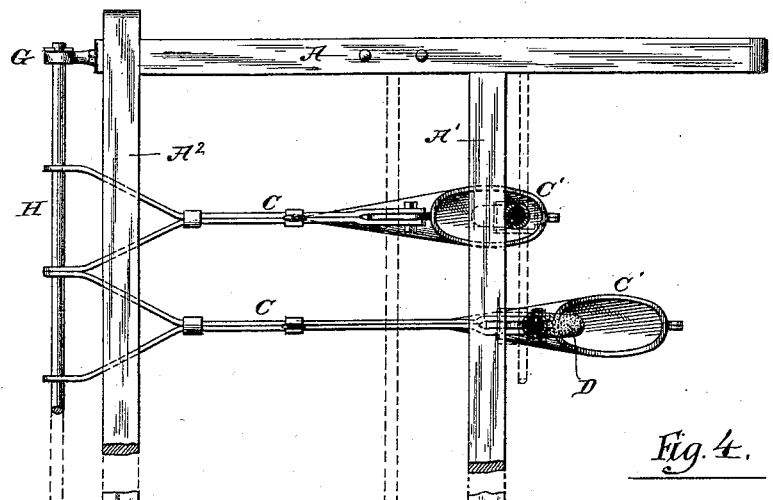
Fig. 4.
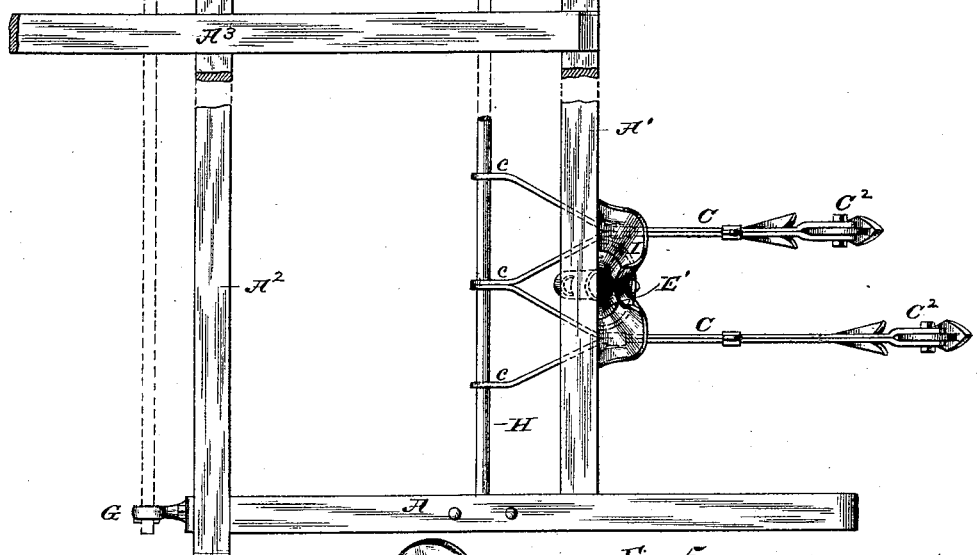
Fig. 5.
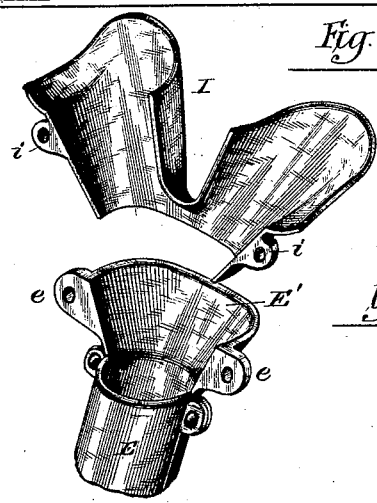
Witnesses:
Louis M. Whitehead.
Jesse Cox Jr.
Inventors:
John S. Rowell
Samuel W. Rowell
Theodon B. Rowell
by M. E. Dayton
Attorney.

UNITED STATES PATENT OFFICE.

JOHN S. ROWELL, SAMUEL W. ROWELL, AND THEODORE B. ROWELL, OF BEAVER DAM, WISCONSIN.

COMBINED OR INTERCHANGEABLE SEEDER AND DRILL.

SPECIFICATION forming part of Letters Patent No. 343,280, dated June 8, 1886.

Application filed May 22, 1885. Serial No. 166,376. (No model.)

*To all whom it may concern:*

Be it known that we, JOHN S. ROWELL, SAMUEL W. ROWELL, and THEODORE B. ROWELL, all of Beaver Dam, in the county of Dodge and State of Wisconsin, have invented certain new and useful Improvements in Combined or Interchangeable Seeders and Drills; and we do hereby declare that the following is a full, clear, and exact description thereof, reference being had to the accompanying drawings, and to the letters of reference marked thereon, which form a part of this specification.

This invention relates to constructions in combined or interchangeable seeders and drills, and has for its object to provide simple and convenient devices by which the interchange may be readily made with such skill and appliances as are commonly at command of the class of operators usually having the operation of this class of machines in hand.

The invention consists in the several matters hereinafter set forth, and pointed out in the appended claims.

Figure 1:
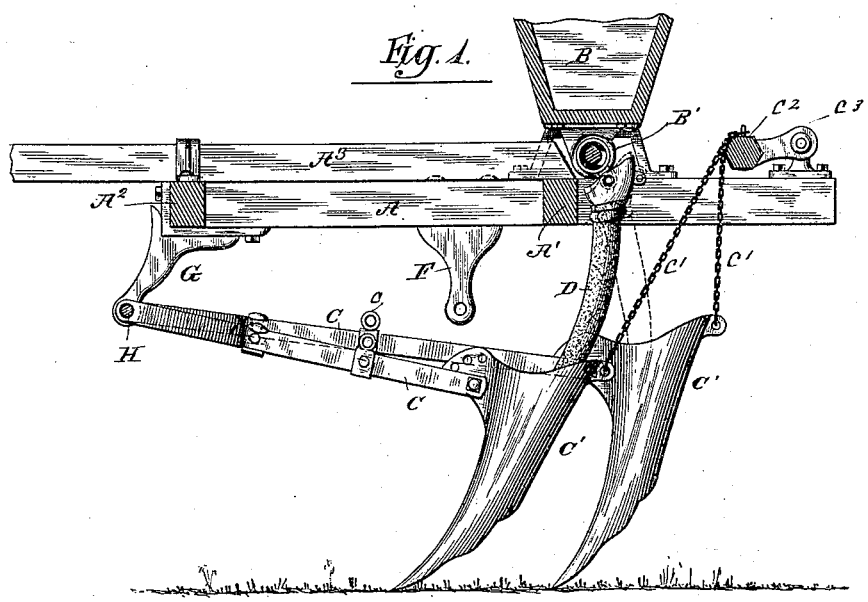
Figure 2:
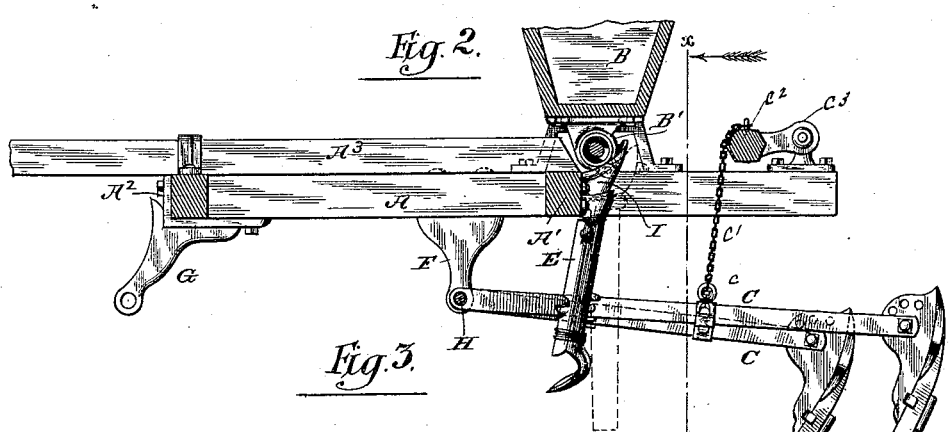
Figure 3:
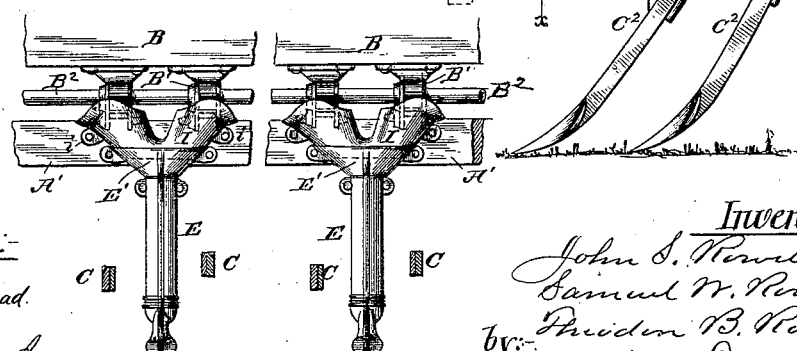

In the accompanying drawings, Figure 1 is a vertical section of the frame, taken parallel with the tongue and between the tongue and the near wheel, and showing the implement as a drill. The wheels are omitted in all figures of the drawings, because not concerned in the invention. Fig. 2 is a similar section showing the implement as a seeder. Fig. 3 is a fragmentary rear view of the seed-box and axle-beam, showing devices employed for conducting the seed from two adjacent feed-cups to a single intermediate scatterer-tube. Fig. 4 is a plan view of the frame and tooth-bars, the upper part of which view shows the implement rigged as a drill, and the lower part of which shows it rigged as a seeder. The seed-box is removed to afford a better view of the essential parts. Fig. 5 is a perspective view showing the upper end of a scatterer-tube as it is preferably constructed to connect with the converging hopper, which directs the seed from two adjacent feed-cups to said scatterer-tube when the latter is placed in its proper position between neighboring tooth-bars in the arrangement of the machine for broadcast seeding.

The mechanism for operating the feed devices are not shown, because not directly concerned in this invention. Any familiar or suitable mechanism may be employed for this purpose.

A A are the side bars of the frame, which, for the purposes of this invention, extend farther forward from the axle-beam A' than heretofore constructed, as will be further explained.

$A^2$ is a cross-bar connecting the forward ends of the side beams, A, and $A^3$ is the tongue, which rests upon and is secured to the cross-bar $A^2$ and axle-beam A'.

B is the usual seed-box, sustained above the axle in the customary relation and by any approved means.

B' are the feed-wheels operated by the rod $B^2$.

C C are tooth-bars, here shown as being made of metal in a familiar form, and provided with hooks or eyes $c$, for the attachment of lifting-chains $c'$, which are raised and lowered by means of some suitable mechanism—as, for example, the familiar one shown consisting of the cross-bar $c^2$, mounted on pivoted arm $c^3$.

C' C' are also a common form of drill-teeth provided with hooks or eyes $c$, and $C^2$ are cultivator or seeder teeth.

D are flexible and detachable feed-spouts for use in connection with the hollow drill-teeth, and E E are scatterer-tubes.

An important feature of the invention consists in the provision for interchangeable connection of the tooth-beams C C at two different points of the frame by means of brackets F and G, set at the full distance apart required in the one case to bring the drill-teeth properly beneath the feed-cups and in the other case to bring the cultivator or seeder teeth far enough behind the feed cups or axle. It is for this purpose that the side beams, A, of the frame are projected forward to an unusual length, as shown, the front brackets, G, being secured to the front ends of said beams, as plainly indicated in Figs. 1, 2, and 4. In this construction all that is required to effect the change of position in the tooth-beams is the withdrawal of the rod H, upon which they are strung from either pair of brackets which it may occupy and its transfer to the other pair with which it is desired to connect the tooth-beams. This is a simple operation that may be performed with the aid of a wrench or hammer only, and with little skill or delay, and it involves none of the complicated contrivances—all liable to get out of order—sometimes employed for this purpose. In making this change in the position of the tooth-beams the chains c' are, of course, detached and reconnected with the appropriate hooks or eyes c, as required.

In connection with the drill-teeth advanced to the position shown in Figs. 1 and 4, the ordinary or any approved form of flexible tube, D, is employed and connected in the usual way with the feed-cup casting; but for delivering the grain to the scatterers when the machine is to be used as a broadcast seeder, special devices are shown by which the scatterer-tubes are brought into position to depend between alternate pairs of tooth-bars, and the grain or seed is conducted to each of said tubes from two adjacent feed-cups. For this purpose a converging funnel or hopper-shaped spout is constructed to reach from one feed-cup to the next to catch the seed from both and to conduct it to the scatterer E. This construction is shown in place in Fig. 3. Preferably, this converging double hopper or spout is made in two parts, one of which, E', is a part of the scatterer-tube casting, and the other and upper part, I, of which is a separate casting capable of being separately attached or removed. By this means the scatterer-tubes themselves may, if desired, be permanently left in place on the machine, and only the broad upper part or hopper, I, removed or replaced when the machine is changed from a seeder to a drill, or vice versa.

As shown in Figs. 2 and 4, the lower edge of the hopper I sets down a short distance into the bell-mouth E' of the scatterer-tube E, and is held against the rear face of the axle-beam (to which the scatterer-tubes are also fastened) by screws which pass through ears $i$. Any other practicable devices may be employed for detachably holding the hoppers or both the hoppers and scatterer-tubes in place, since the invention is not restricted to this or other precise details of construction, as shown.

We claim as our invention—

1. The combination, with the forwardly-prolonged frame-beams A and tooth-beams, as C, of two pairs of oppositely-arranged brackets, as F and G, and a rod, H, upon which the beams C are pivoted, whereby the tooth-beams may be secured in either the advanced or retreated position shown, substantially as and for the purpose set forth.

2. The combination, with the side frame-beams, A, having front and rear pendent supports or brackets at F G for a transverse draft-rod, H, of said draft-rod H, a series of tooth-beams pivoted at their front ends upon said rod, and provided with hooks or eyes between their ends for the attachment of lifting-chains, detachable drill-teeth, also provided with hooks or eyes for the attachment of said chains, and lifting-chains connected with suitable lifting mechanism, substantially as described, and for the purpose set forth.

3. In an interchangeable seeder and drill, adapted to support the tooth-beams in an advanced and also in a relatively retreated position, the combination, with the feed-cups and an adjacent cross-beam of the frame, of scatterer-tubes provided with wide-mouthed hoppers adapted to be removably secured on the said adjacent cross-beam in position to conduct seed from two adjacent feed-cups to a single scatterer, substantially as described.

4. In an interchangeable seeder and drill, adapted to support the tooth-beams in an advanced and also in a relatively retreated position, the combination, with two adjacent feed-cups, of a scatterer provided with a flaring top, E', and a separate hopper, I, adapted to be secured on the contiguous cross-beam of the frame in position to receive the seed from both said feed-cups and to conduct the same to the scatterer-tube, substantially as described.

5. The combination of the forwardly-prolonged side frame-beams A, brackets F, and brackets G, relatively located, as shown, on said beams A, and a removable rod, H, for the support of the tooth-beams in their advanced and retreated positions, a feed-box, B, provided with suitable feed devices, B', adjacent to the axle-beam A', removable feed-spouts D, scatterers E, and metal hoppers I, adapted to be detachably secured to the axle-beam, the whole embraced in an interchangeable broadcast seeder and drill, substantially as described.

In testimony that we claim the foregoing as our joint invention we affix our signatures in presence of two witnesses.

JOHN S. ROWELL.
SAML. W. ROWELL.
THEODORE B. ROWELL.

Witnesses:
LYMAN W. BARBER,
H. W. KEYES.